S. E. ODELL.
PANORAMIC CAMERA.
APPLICATION FILED APR. 11, 1917.
1,266,616.
Patented May 21, 1918.
3 SHEETS—SHEET 1.
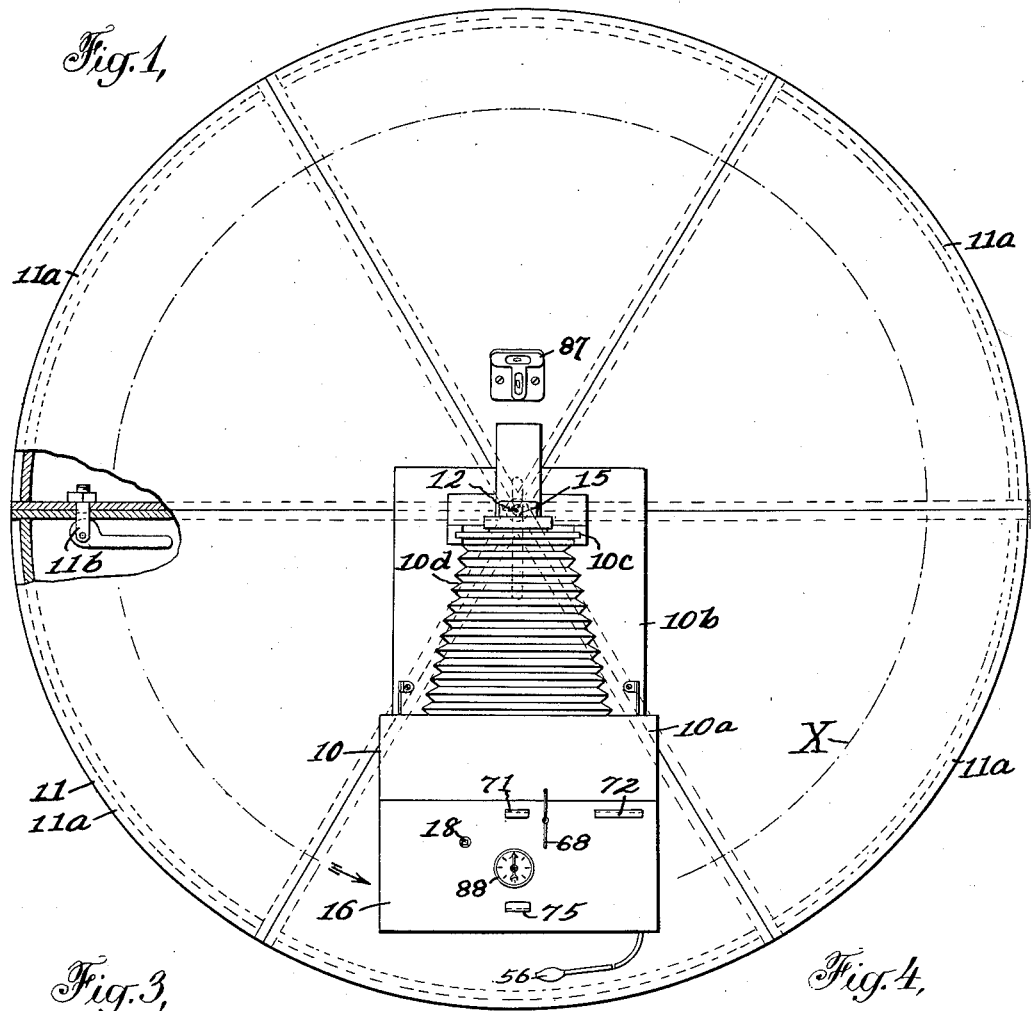
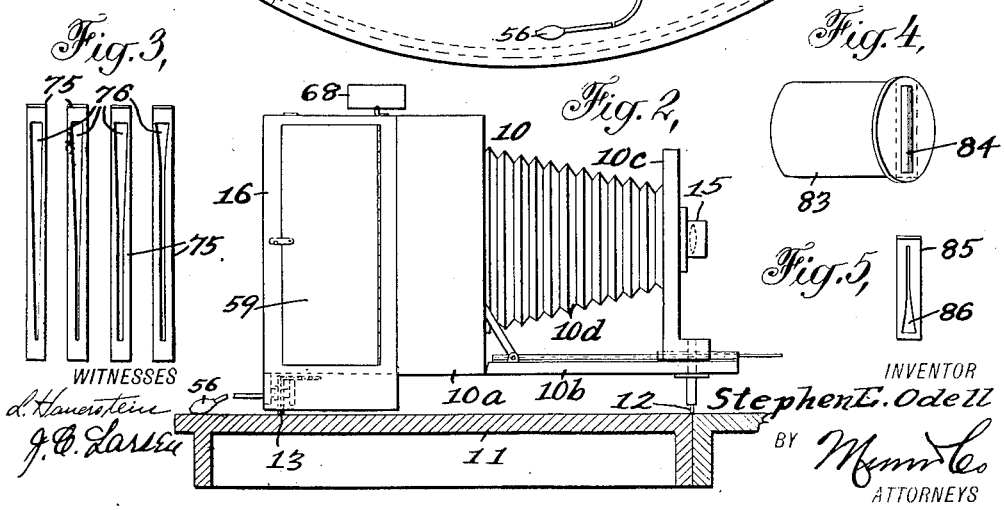
WITNESSES
INVENTOR
Stephen E. Odell
BY
ATTORNEYS S. E. ODELL.
PANORAMIC CAMERA.
APPLICATION FILED APR. 11, 1917.
1,266,616.
Patented May 21, 1918.
3 SHEETS—SHEET 2.
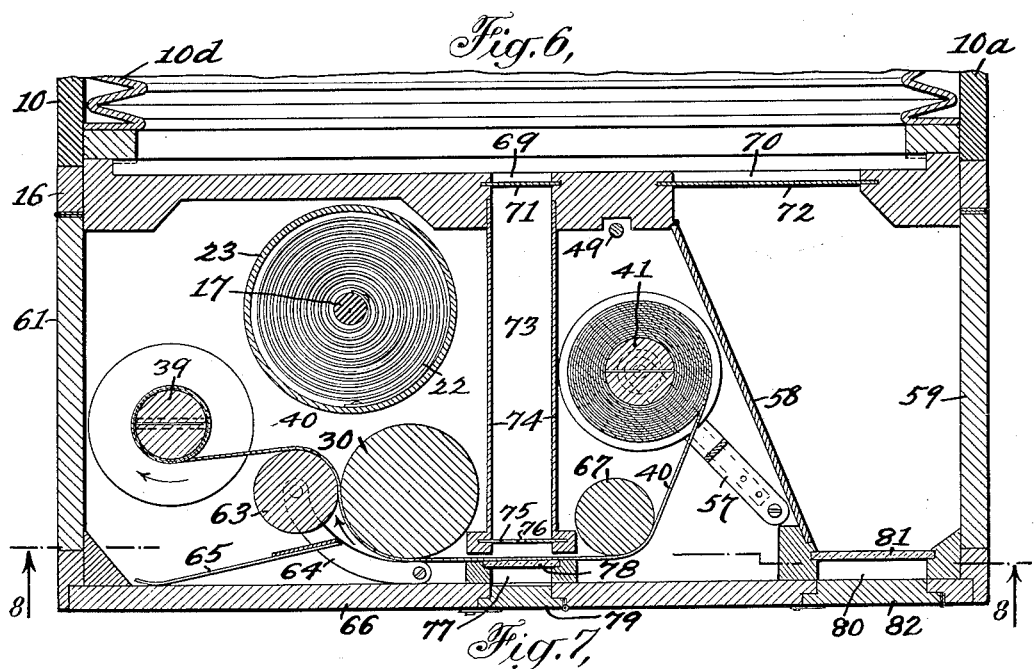
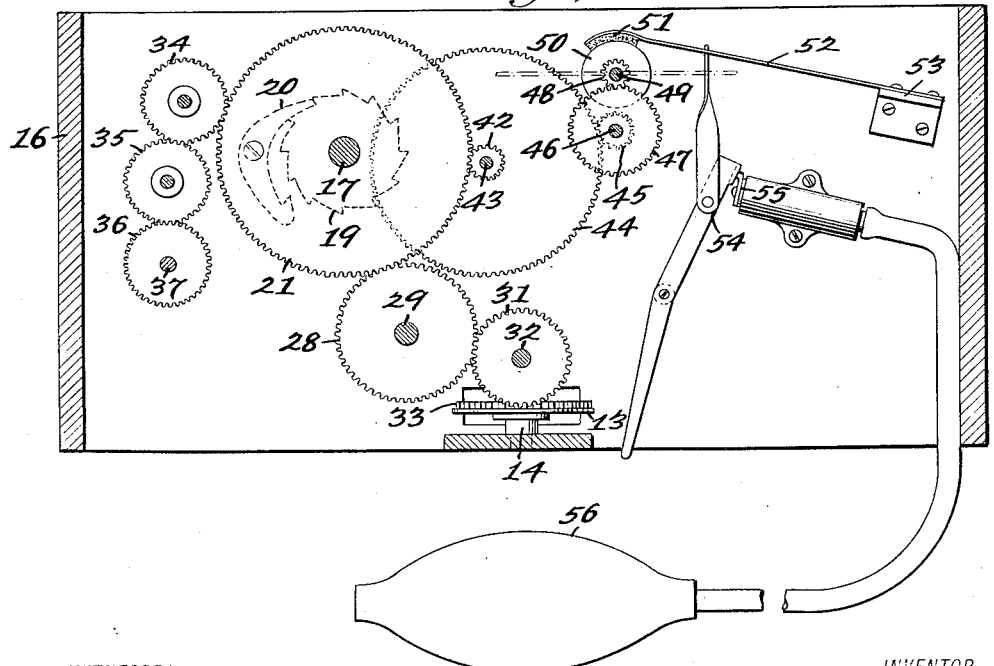
WITNESSES
INVENTOR
Stephen E. Odell
ATTORNEYS

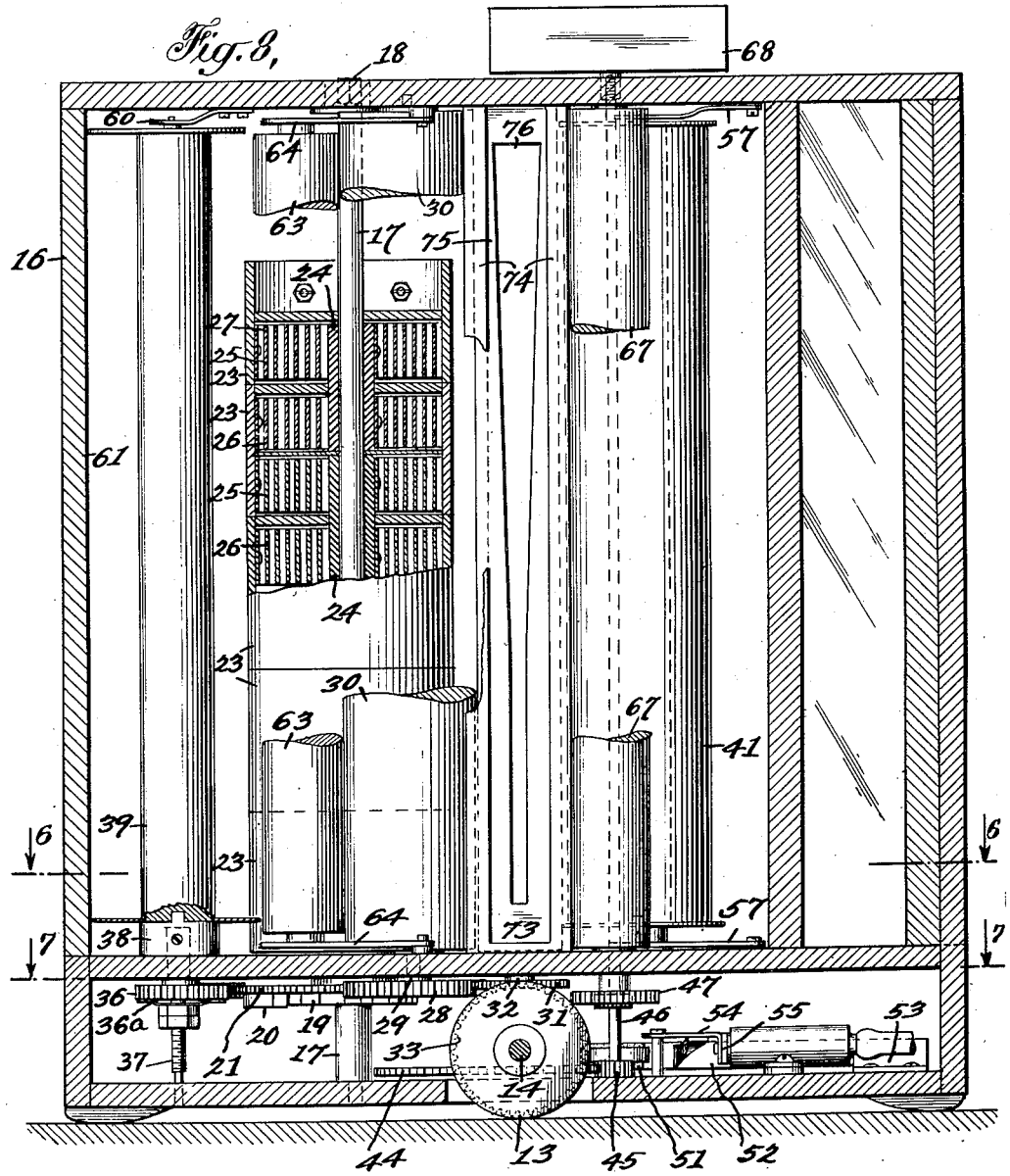

UNITED STATES PATENT OFFICE.

STEPHEN EUGENE ODELL, OF BELLINGHAM, WASHINGTON.

PANORAMIC CAMERA.

1,266,616.     Specification of Letters Patent.     Patented May 21, 1918.

Application filed April 11, 1917. Serial No. 161,168.

*To all whom it may concern:*

Be it known that I, STEPHEN E. ODELL, a citizen of the United States, and a resident of Bellingham, in the county of Whatcom and State of Washington, have invented certain new and useful Improvements in Panoramic Cameras, of which the following is a specification.

My invention relates to panoramic cameras, and one of the main objects thereof is to provide an apparatus of this class which permits the use of a lens of any focus without the necessity for changing any of the parts for the reason that the camera revolves throughout a partial or a complete circle about the optical center of the lens.

This requires that a suitable support for the camera shall be provided for such revolution, a transverse table being shown in the drawings, and another important object is to provide means for moving the camera over the table in such manner that the length of film fed during a given period shall equal the distance of camera movement over the traverse table on a circle of which the focal length of the lens is the radius.

A further important object is to provide means for accommodating the amount of light admitted to the camera, or rather to the film, to distant objects which it is desired to photograph through the medium of slide shutters of varying shapes of apertures to so modify the light on the distant objects as to decrease the length of time that the rays of light are permitted to act on the sensitized medium, thus preventing overexposure and consequent over-development. These shutters may be arranged at the lens or they may be just forward of the focal plane of the camera, both forms being illustrated.

Another important object is to provide a motor of the spring type which will operate for very long periods and be of very light and compact form, so as not to be objectionable.

Another important object is to provide a suitable control for the motor, both the fan and brake controls being shown in the drawings.

Another important object is to provide the usual focusing screen for use before the camera is loaded, and to provide a supplemental focusing screen which may be used after the camera has been loaded and a part of the film already exposed.

Another object is to so construct the traverse table as to be readily taken apart whereby it may be stored in a suitable carrying case, either with or without the camera.

And other objects are to provide such an apparatus which is relatively light and compact to be easily portable, which may be quickly and easily loaded in daylight, which is thoroughly practical and highly efficient, and which is comparatively inexpensive.

My invention is fully described in the following specification, of which the accompanying drawings form a part, in which like characters refer to like parts in each of the views, and in which:—

Figure 1 is a top plan view of my apparatus in position for use, partly broken away to show a detail of construction;

Fig. 2 is a side view thereof, on a reduced scale, with the traverse table broken away;

Fig. 3 is a view of a plurality of interchangeable slide shutters which I employ in the focal plane of the camera;

Fig. 4 is a view of a barrel which I may use on the lens for holding one of a plurality of shutters similar to those shown in Fig. 3, but smaller;

Fig. 5 is a view of one of said slides;

Fig. 6 is a sectional plan view taken on the line 6—6 of Fig. 8;

Fig. 7 is a similar view taken on the line 7—7 of Fig. 8;

Fig. 8 is a vertical section taken on the line 8—8 of Fig. 6; and

Fig. 9 is a view of an interchangeable detail of the construction.

In the drawings forming a part of this application I have shown a present preferred embodiment of my invention comprising the camera 10 adapted to be moved over a traverse table 11 about a pivot 12 held centrally of said table, this movement being accomplished by means of a motor-actuated wheel 13 on a shaft 14, the said wheel being in the plane of the focal plane of the camera, though beneath the camera, and the axis of the shaft 14 being on the vertical axial plane of the lens indicated at 15, and I will always arrange the pivot 12 directly beneath the optical center of said lens. The distance from the center of the pivot 12 to the wheel 13 is always the same as the focal length of the camera inasmuch as the wheel is moved toward or from the pivot in the focusing of the camera.

The table 11 comprises a plurality of sectors 11ª collectively forming a circle when joined, each of said sectors being locked to its adjacent sector by means of a suitable clamp 11ᵇ, Fig. 1, whereby I may take the sectors apart for storage and carriage whenever desired, it being understood that the table will be used upon a suitable tripod, not shown.

The camera is shown of folding type and consists of a box 10ª provided with a drop-front 10ᵇ, lens carrier 10ᶜ slidable thereon, and bellows 10ᵈ, all of the usual or any desired form, but I substitute a casing 16 for the conventional camera back and connect said casing with the camera by the usual or any desired means to render movement of one on the other impossible, and to make a light-proof joint therebetween.

The casing 16 carries a vertically arranged power shaft 17 suitably journaled and provided with an angular upper end 18 for engagement with a key, and with a ratchet 19 engaged by a pawl 20 mounted on a gear wheel 21 freely rotatable on said shaft. The shaft 17 has one end of a clock-spring 22 secured thereto adjacent its lower end and the other end of which is secured to a cylindrical shell 23, a plurality of which are provided with a spring in each, and the description of one set of which, as shown in Fig. 8, will suffice.

The shaft 17 carries a plurality of sleeves 24, the joints between which are staggered with respect to the joints between the shells 23. The lower spring 25 in each shell is secured to the upper end of the sleeve 24 projecting into the next lower shell, and the higher spring 26 in each shell is secured to the lower end of the sleeve projected into the next upper shell. As stated, the lowermost spring 22 is secured to the shaft 17, and the uppermost spring 27 is secured to the uppermost shell which is, in turn, secured to the casing 16. Rotation of the shaft by means of a key winds the lowermost spring 22 and the successively superimposed springs are successively wound thereafter until all are wound, and a relatively long period of spring unwinding results from this arrangement, one winding being sufficient for several revolutions of the camera.

The gear 21 is enmeshed with a gear 28 on a shaft 29 carrying a roller 30 and the rearward side of which is in the focal plane of the camera, as clearly shown in Fig. 6; the gear 28 is enmeshed with a gear 31 on a stub-shaft 32 which gear 31 is in turn enmeshed with a vertically arranged gear 33 on the horizontal shaft 14 arranged, as stated, in the vertical axial plane of the lens 15, this shaft 14 carrying the wheel 13 keyed or otherwise secured thereto, or the gear 33 may be secured to the wheel 13 and both be freely rotatable on the shaft 14.

The gear 21 is also enmeshed with an idle gear 34 in turn enmeshed with another idler 35 enmeshed with a gear 36 frictionally held by means of suitable nuts and a spring 36ª on a shaft 37 which carries a disk 38 at its upper end in detachable connection therewith, said disk being provided with suitable means on its upper surface for engagement with the re-wind roller 39 for the film 40 when drawn from the roller 41 in the manner to be described.

The gear 21 is also enmeshed with a pinion 42 on a shaft 43 carrying a gear 44 enmeshed with a pinion 45 on a shaft 46 carrying a gear 47 enmeshed with a pinion 48 on a shaft 49 carrying a brake-drum 50 against which bears a brake-shoe 51 carried by an arm 52 secured to the casing 16 at 53, a toggle lever 54 being provided for manually releasing said shoe from said drum, but this may also be accomplished by means of the air actuated plunger 55 operable through the medium of the bulb 56 in the conventional manner of shutter operation.

The film roller 41 is carried by upper and lower pivoted arms 57 whereby said roller may be swung outwardly through an interior opening closed normally by a door 58 to a point adjacent an opening in the side of the casing closed by a door 59, thus allowing ready substitution of a new film roller for an exhausted one.

The re-wind roller 39 is engaged at its lower end by the disk 38 and at its upper end by a spring arm 60 allowing said roller to be lifted from said disk for removal from the casing 16 through an opening protected by a door 61, and I may supply substitute disks, one of which is shown at 62 in Fig. 9, to accommodate the shaft 37 to different types of rollers 39.

Bearing against the film feed roller 30 is a tension roller 63 carried by pivoted arms 64 enabling the roller 63 to be rearwardly swung away from the roller 30 to pass the film therebetween, a spring 65 being provided for maintaining the roller 63 in operative position and which bears against the inner side of a removable back 66, and I also provide a film guide roller 67 the rear edge of which is in the focal plane of the camera.

The shaft 49 which carries the brake-drum 50 is extended through the top of the casing 16 and is threaded or otherwise arranged to receive a fan governor 68, as shown by dotted lines in Fig. 8, and I may provide different fans for different desired speeds of film movement.

The casing 16 is provided with a central opening 69 and with a supplemental opening 70 in the front thereof, the former of which may be closed by means of an opaque slide 71 and the latter by means of a similar slide 72 inserted through suitable slits in the top of the casing. In register with the opening 69 is a passage 73 formed by opaque plates 74 terminating at the focal plane of the camera and closed by one of a plurality of slides 75 having a slot 76 therein, as shown in Fig. 3, the slots of the several slides being formed to meet conditions as by making the upper ends thereof gradually widened to admit more light from the lower part of a subject than from the upper part thereof, such as the sky, and formed to secure distance without over-exposure of the lighter parts of the film, these slides being interchangeable.

A complemental passage 77 is provided for the passage 73 to the rear of the film protected by a ground glass screen 78 and a door 79 in the removable back 66, whereby the camera may be focused before the film is threaded therethrough, and I provide an opening 80 in the back 66 protected by a ground glass screen 81 and a door 82, through which screen 81 the camera may be focused when the film is in position for exposure.

In Fig. 4 is shown a tube 83 which may be telescoped over the barrel of the lens 15, the front of said tube being closed with the exception of a vertical slot 84, and a vertical passage is provided adjacent the closed end of the tube for the reception of a slide 85, Fig. 5, which has a slot 86 and therefore is the full equivalent of the slides 75, except that they are reversed top to bottom. The slides 85 are not employed when the slides 75 are used, and vice versa, as they are identical in result, the only distinction being that the former are in front of the lens and the latter in the focal plane of the camera, approximately.

As shown in Fig. 1, I provide a level 87 on the table 11, or on the camera if desired, and I show a compass 88 on the camera, but these may be arranged in any convenient positions, and may be provided or dispensed with at will.

The film 40 is threaded through the camera in the manner shown and, when the power shaft 17 is permitted to rotate by removing the brake-shoe 51 from the drum 50, the re-wind roller 39 is rotated to wind the film thereon at the controlled speed. In this roller actuation the wheel 13 is revolved and the camera travels through a circle or an arc thereof at the controlled speed, the number of inches of film feed being equal to the number of inches of camera movement along the circle X, Fig. 1, traversed by the wheel 13 because of the fact that the diameter of the film feed roller 30 equals the diameter of the wheel 13.

When it is desired to expose the film the slide 69 is removed and the desired slide 75 placed in position, and a series of vertical ribbons blended into each other results on the film through this exposure, the character of these being determined by the shape of the particular slot 76 used, or, if the tube 83 is used instead, by the shape of the slot 86 in the slide 85 being used.

If desired, the slide 72 may be removed and the door 82 opened to allow focusing through the ground glass 81 while the film is in operative position and, because of the great duration of unwinding of the series of springs in the motor, the camera may be moved through an entire circle on its pivot 12, with the optical center of the lens always directly over said pivot.

While I have shown a present preferred form of construction, I do not limit myself thereto, but may make changes thereover, within the scope of the following claims, without departing from the spirit of my invention or sacrificing its advantages.

Having fully described my invention, what I claim as new, and desire to secure by Letters Patent, is:—

1. The combination with a camera provided with a lens and rollers having a film thereon; of a pivot arranged directly beneath the optical center of said lens for connecting said camera with a table, a spring operated motor, a film feeding roller between said film holding rollers, means for connecting the motor with one of said film holding rollers and with said film feeding roller, and means actuated directly from said motor for swinging said camera on its pivot.

2. The combination with a camera provided with a lens and rollers having a film thereon; of a pivot arranged directly beneath the optical center of said lens for connecting said camera with a table, a spring motor within the camera consisting of a shaft, a plurality of independently movable sleeves thereon, a plurality of springs connected with said sleeves, a plurality of shells connected with the respective springs, adjacent springs being secured to one shell and to two sleeves or one sleeve and two shells, means for holding the outermost shell immovable, and a spring connecting the innermost shell with said shaft, means actuated by said motor for moving said film, and means actuated by said motor for swinging said camera on its pivot.

3. The combination with a camera provided with a lens and film holding rollers having a film thereon; of a pivot arranged directly beneath the optical center of said lens for connecting said camera with a table, a spring motor, a brake controlling the same, means for releasing said brake, a motor actuated roller for feeding said film located between said holding rollers, and motor actuated means for swinging said camera on its pivot.

4. The combination with a camera provided with a lens and rollers having a film thereon; of a pivot arranged directly beneath the optical center of said lens for connecting said camera with a table, a spring motor, motor actuated means for feeding said film, a traverse wheel resting on said table, and means for operatively connecting said motor and wheel independent of said film feeding means, to swing said camera on its pivot.

5. The combination with a camera provided with a lens and film holding rollers having a film thereon; of a pivot arranged directly beneath the optical center of said lens for connecting said camera with a table, a spring motor, means directly connected to the motor for swinging said camera on its pivot, a film feeding roller engaging the film between said holding rollers, and means directly connecting said motor with said film feeding roller.

6. The combination with a camera provided with a lens and film holding rollers having a film thereon; of a pivot arranged directly beneath the optical center of said lens for connecting said camera with a table, a spring motor, a traverse wheel resting on said table, a film feeding roller, of the same diameter as said wheel engaging the film at a point between said holding rollers, gearing directly connecting said roller and said traverse wheel with said motor to simultaneously actuate said wheel and roller at the same speed.

7. In a panoramic camera, a diaphragm provided with a slot of greater width at one end than at the other to increase the volume of light at the wider end, and a tube carrying said diaphragm for mounting the same on the barrel of a lens.

In testimony whereof I have signed my name to this specification in the presence of two subscribing witnesses.

STEPHEN EUGENE ODELL.

Witnesses:
CHAS. J. BORNSTEIN,
FRANK L. CLIFT.